US005867762A

United States Patent [19]

Rafferty et al.

[11] Patent Number: 5,867,762

[45] Date of Patent: Feb. 2, 1999

[54] MASKING TAPE

[76] Inventors: Kevin Rafferty, 193 Countryview Dr., Harrison, Ohio 45030; Bruce Rowe, 3043 Wold Ave., Cincinnati, Ohio 45206

[21] Appl. No.: 552,524

[22] Filed: Nov. 6, 1995

Related U.S. Application Data

[62] Division of Ser. No. 249,864, May 26, 1994, abandoned.

[51] Int. Cl.[6] ................................ B32B 5/22; B32B 5/26; B32B 5/30; B32B 5/32

[52] U.S. Cl. .......................... 428/548; 428/551; 428/566; 428/622; 428/623; 428/624; 428/626; 428/629; 428/632; 428/668; 428/678; 428/679; 428/680; 428/681; 428/682; 428/317.1; 428/317.5; 428/317.7; 428/317.9; 428/328; 428/421

[58] Field of Search ................................ 428/328, 304.4, 428/311.1, 317.9, 421, 422, 305.5, 317.1, 548, 551, 566, 622, 623, 624; 427/259, 282, 287, 419.1, 419.2, 190, 191, 192, 201, 202, 205

[56] References Cited

U.S. PATENT DOCUMENTS

| | | | |
|---|---|---|---|
| 4,128,522 | 12/1978 | Elam | 260/32.8 R |
| 4,194,040 | 3/1980 | Breton et al. | 428/308 |
| 4,228,214 | 10/1980 | Steigelman et al. | 428/212 |
| 4,845,139 | 7/1989 | Baldi | 524/407 |

*Primary Examiner*—Vivian Chen
*Attorney, Agent, or Firm*—Wood, Herron & Evans, LLP

[57] ABSTRACT

A masking tape for preventing the formation of coatings such as nickel aluminide on localized areas of a surface is formed from a tape comprising a first separating layer containing powdered metal oxide and a polytetrafluoroethylene binder; a second brazing alloy layer comprising a metal selected from the group consisting of brazing alloy, nickel, cobalt, iron, mixtures thereof, and alloys thereof in a fibrillated polytetrafluoroethylene binder; and an optional third layer comprising a powdered metal selected from the group consisting of nickel, cobalt, and iron in a fibrillated polytetrafluoroethylene binder.

2 Claims, No Drawings

MASKING TAPE this application is a divisional of application Ser. No. 08/249,864, filed May 26, 1994, abandoned.

BACKGROUND OF THE INVENTION

Nickel aluminide coatings are used in the aerospace industry to provide high temperature oxidation protection for nickel alloy jet engine parts. To form a nickel aluminide coating, the part to be coated is placed in a coating box or retort and covered in a powder composed of aluminum or an alloy of aluminum, calcined aluminum oxide powder (as an inert filler) and a halogen generating carrier compound which upon heating to a suitable temperature, places aluminum atoms in contact with the basic nickel containing surface. In this procedure, a chemical reaction takes place with the result being alloying of nickel (cobalt, iron or other suitable element) from the basis metal with aluminum from the coating powder. During engine operation, the resultant coating forms an extremely dense oxide layer on the metal surface preventing any further oxidation and subsequent attack of the basis metal. This improves the lifetime of the part.

During operation, however, the coating may become damaged due to the operational environment. If the coating of the entire part was abraded away, the entire part could be retreated.

Generally, however, the coating becomes damaged only in a small area. General Electric Company currently markets a Codal repair tape which is an iron aluminum alloy used in tape form. This uses some type of acrylic or other binding system which is proprietary to the General Electric Company. However, this tape is generally unsuitable because it is stiff and has a shelf life. It is preferred, however, to use a localized aluminide coating application.

SUMMARY OF THE INVENTION

It is accordingly an object of the present invention to provide alloying type pack cementation coating tape such as nickel aluminide which can be placed in a localized area to coat only a depleted area of a part.

Further, it is an object of the present invention to provide an effective efficient nickel aluminide type pack cementation coating tape which conforms easily to the metal surface.

Further, it is an object of the present invention to provide such a tape which upon heating actually cleans the parts surface to facilitate more efficient coating.

It is also an object of the present invention to provide a masking tape to prevent coating of localized areas of a metal surface.

The present invention is premised upon the realization that such an alloy cementation type coating can be applied onto a nickel, cobalt, platinum or iron based alloy or metal using a reactable tape formed from elemental metal or an alloy, a filler, a carrier compound, and a binder wherein the binder is fibrillated polytetrafluoroethylene. The hard metal surfaces include, of course, all forms of stainless steel, as well as nickel, cobalt, titanium and tungsten based superalloys such as Rene 35, Rene 41, Rene 77, Rene 80, Rene 80H, Rene 95, Rene 125, Rene 142, Inconel 713, Inconel 718, Hastelloy X, Wasp alloy, Haynes 188, L605, X-40, and MarM-509.

Preferably a nickel aluminide coating tape can be formed with fibrillated polytetrafluoroethylene, aluminum or an aluminum alloy, a filler and a halogen generating compound.

The formed tape is malleable so that it conforms to the surface which is being coated and further, the polytetrafluoroethylene upon heating liberates hydrogen fluoride which cleans the surface being coated. Further, it adequately binds the elemental metal as well as the filler together to keep them in position in defined quantities along a specified area and permits them to react to provide metal ions which react with the nickel base metal.

Further, a masking tape is disclosed which includes preferably three layers, a separating layer of an inert material such as calcined aluminum oxide, a brazing alloy layer and preferably a nickel outer layer. Each layer is held together by a fibrillated PTFE carrier.

The objects and advantages of the present invention will be further appreciated in light of the following detailed description.

DETAILED DESCRIPTION

The present invention is an alloying tape which includes elemental metal, a filler, a halogen carrier composition and a binding composition, used to coat metal surfaces.

The binding composition is specifically fibrillated polytetrafluoroethylene. Fibrillated PTFE polymer used in the present invention is a high molecular weight PTFE resin produced by emulsion polymerization. The PTFE polymers have a broad molecular weight range of 10 to 20 million and are commercially available products.

Preparation of these polymers, which is described in U.S. Pat. No. 2,510,112, U.S. Pat. No. 2,587,357, and U.S. Pat. No. 2,685,707 involves well known emulsion polymerization techniques wherein the tetrafluoroethylene under pressure in water containing an emulsifying reagent is reacted with a water soluble free radical catalyst. The emulsion produced is coagulated, washed, and dried.

The average particle size of the polymer is 50 to 560 microns. Although polymers having larger or smaller particle size will function in the present invention. The PTFE used in the present invention is a fibrillated polytetrafluoroethylene sold by DuPont of Wilmington, Del. under the trade designation Teflon® 6C.

The PTFE, acts to bind the elemental metal carrier and filler. Generally, from about 1% to about 6% by weight fibrillated polytetrafluoroethylene is employed and preferably about 3%.

In addition to the binder, the present invention includes from about 50% to about 65% of a powdered (−100 preferably at least −325 mesh) metal or metal alloy. Suitable metals include aluminum, chromium, chromium aluminum alloy, silicon aluminum alloy, titanium aluminum alloy, vanadium aluminum alloy, and vanadium. These metals are reacted with halide ions to form metal halide compounds. The metal halide reacts with basis metal to form a basis metal-metal alloy and the halogen is liberated. The metal powder should be in an amount from about 1 to about 90% by weight with 58% being preferred.

In addition to the metal as well as the binder, the present invention also includes a filler. This basically keeps the metal from binding to the surface of the part prior to reacting. Generally, the filler will be calcined aluminum oxide or titanium dioxide with aluminum oxide being preferred. Generally, the filler will include 8% to 95% by weight with 37% being preferred.

Finally, the present invention includes a halogen source which will react with the metal to carry the metal ions to the surface of the basis metal where they will react with the nickel. Generally, suitable halides include ammonium chloride and ammonium fluoride. Typical 1% halide carrier is used.

These components are combined to form a malleable tape. To form this, the individual components are measured and combined in a ball mill or other low shear mixtures such as a KD mixer with kinetic dispersion or a vibratory mixer. In a ball mill, the mixer is run at about 200 rpm with stainless steel balls for about 20 to 40 minutes with 25 minutes generally being acceptable.

The mixture is then separated from the steel balls and rolled between adjustable rollers to a thickness of about 0.002" to about 0.25". When being rolled, the mixture is separated from the rollers by stainless steel separation sheets, preferably a metal foil such as aluminum foil.

The mixture is rolled between the pressure rollers in the first direction and then the sheet folded upon itself in half and rolled again in a direction 90° from the initial rolling. This can be repeated until the desired thickness and consistency is obtained.

The formed tape is then cut to the desired size and pressed against the metal surface which is being coated. Pretreatment of the metal surface is not always necessary although it must be clear of dirt and grease.

It may be desired to fluoride clean the surface prior to coating. This can be done by the method described in our copending application entitled Fluoride Cleaning of Metal Surfaces and Product, filed on even date herewith. The disclosure of which is incorporated herein by reference.

To form the pack cementation coating, the tape, as described above, is placed on the surface of the part which is put in an oven and heated to a temperature of about 1250° to 1350° F. for 0.5 to about 3 hours with the typical time being about 1.5 hours. Preferably, this will be conducted in a hydrogen atmosphere.

This process causes a chemical reaction to occur in which fluoride or chloride compound breaks down to form halide ions which react with the metal (or metal alloy) atoms forming the metal halide compound. When the metal halide contacts the basis metal surface, the metal in the metal halide compound is reduced to elemental metal which can alloy with the basis metal.

More specifically, metal ions, such as aluminum, vanadium or chromium react with the nickel, iron or cobalt of the basis metal to form the aluminide or nickel vanadium or nickel chromium composition. The end result is a localized coating of metal alloy which is tightly bound to the part.

In many applications it is preferable to mask certain portions. Accordingly, a masking tape can be used. The preferred masking tape is a two or a three layer masking tape which masks an area protecting it from the pack cementation coating and actually scavenges metal ions to prevent their application to the masked area.

The masking tape is formed in a manner similar to the coating tape or alloying tape. The first layer is formed from an inert separating material bonded together by a fibrillated polytetrafluoroethylene. The inert separating material will generally be a metal oxide with a melting temperature greater than 3000° F. and which does not react with the basis metal at this temperature. Specifically, the inert separating material can be, for example, calcined aluminum oxide powder, calcium oxide, magnesium oxide, titanium oxide, hafnium oxide or tantalum oxide. Generally these will have a particle size of about +100 to −325. One or more of these compositions is mixed with about 1 to about 6% fibrillated polytetrafluoroethylene and processed into a tape as previously described with respect to the alloying tape. This is formed into a tape which has a thickness of about 0.004" to about 0.020".

The second or intermediate layer is a brazing alloy powder or other metal alloy metal powder or elemental nickel or cobalt bounded together again by the polytetrafluoroethylene. Suitable alloying powders include AMS 477 brazing alloy powder which is a nickel based alloying powder, preferably −325 mesh in size. Others which are limited primarily to nickel, cobalt and iron containing alloys such as General Electric specification B50TF204, AMS 4778, GE specification B50TF205, AMS 4779 and GE specification B50TF206. The brazing alloy is combined with 1 to 6% PTFE, preferably about 2% PTFE and processed as previously described for the alloying tape. This is then rolled to a thickness of about 0.02" to 0.04".

The third layer or outer layer, which is optional, is formed from powdered elemental or alloyed metal such as nickel, iron, cobalt, hafnium or titanium. About 98% metal as powder is combined with 2% polytetrafluoroethylene and processed as previously described. It should be rolled to a thickness of 0.020 to about 0.040".

The composite three layer masking tape is formed by placing the three layers on top of each other and running the three layers through a roller which compresses their overall thickness by about 50%. This binds the three layers together forming a lower layer of about 0.002–0.010, an intermediate and outer layer of from about 0.01 to about 0.020". Preferably, the lower layer is as thin as possible, closest to the 0.002 level and the second and third layers are preferably about 0.040" total in thickness. The lower layer needs only be thick enough to reliably provide a separation surface.

The middle layer, which is predominantly nickel or iron, provides a surface for the coating reaction to take place substituting for the basis metal and reducing or eliminating any available aluminum from the coating powder which would normally deposit on the area or surface being masked. At temperatures at or above the liquid state of the alloy in this layer, a cohesive shield forms from the sintering or melting of the alloy. This shielding effect provides a physical barrier to the coating powder preventing deposition on the part surface. The liquidus state of the layer increases its bonding activity by providing movement of the atoms within the layer exposing unreacted particles at an accelerated rate.

The outermost layer, again, provides a surface for coating reaction to take place substituting for the basis metal and reducing or eliminating available aluminum from the coating powder which normally deposits in the area or surface being masked. It also prevents a possible brazing of the middle layer to the adjacent parts in the coating box or retort should there be accidental contact. Also, the layer will prevent possible flow of alloy from the second layer onto the masked part by the infiltration and/or bonding of the second layer into the outer layer.

To use this, the part being coated is simply covered with the masking tape using a suitable adhesive such as Nicrobraze 200 cement. This part is also covered at selected portions with the pack cementation coating and heated as previously described. The masked area will not be coated by the pack cementation coating. This masking process will be further appreciated in light of the following detailed example.

EXAMPLE 1

A high pressure turbine blade which has been nickel aluminide coated has been accidently dropped onto a hard surface damaging the coating in a small area near the platform. The dovetail is and is requested to be uncoated. A tape is manufactured comprised of 37.2% aluminum powder, 55.8% calcined aluminum oxide, 1% ammonium chloride, and 6% PTFE resin. The tape is applied to the repair area with a suitable adhesive. The dovetail is wrapped with the masking tape using Nicrobraze 200 cement as the adhesive. The masking tape will prevent any coating "leakage" onto the dovetail surface. The part is then processed through a thermal cycle at approximately 1275° F. for approximately 30 minutes. The details of part preparation and processing are stated previously.

EXAMPLE 2

This is an example of using the masking tape with a traditional pack coating; not with coating tape.

A high pressure turbine blade is to be nickel aluminide coated, but a requirement exists which does not allow coating to be deposited on the dovetail. A piece of the present invention large enough to wrap around the complete dovetail is applied to the part using a Nicrobraze 200 brand adhesive. The tape has a first layer of aluminum oxide, a second layer of AMS 4777, and a third layer of pure nickel powder (all bonded with PTFE as previously described). The part is then processed through the normal pack coating cycle. The tape residue is subsequently removed by brushing off.

As shown by these examples, using the present invention is highly advantageous in that the polytetrafluoroethylene resin upon thermal degradation produces hydrogen fluoride which is a cleaning agent. This is particularly important where the halogen carrier is aluminum chloride which does not provide any significant cleaning. Further, the hydrogen fluoride gas also itself acts as a halogen carrier to aid in the deposition of metal such as aluminum onto the surface. This, combined with the ability to very simply mold the coating tape on the surface of the particle which is being coated with this pack cementation coating, makes the present invention a simple, easy, inexpensive and efficient way to coat portions of jet engine parts.

The masking tape acts in conjunction with the coating tape when used to ensure the coating is not applied to certain locations such as machined surfaces.

Although this has been a description of the present invention along with a preferred embodiment of the present invention, the invention itself should be defined only by the appended claims wherein we claim:

What is claimed is:

1. A masking tape comprising a first layer comprising a powdered inert metal oxide bonded together by fibrillated polytetrafluoroethylene, said first layer bonded to a second layer comprising a metal selected from the group consisting of brazing alloy, nickel, cobalt, iron, and mixtures thereof and alloys thereof, said metal bonded together by fibrillated polytetrafluoroethylene.

2. The masking tape claimed in claim 1 wherein said masking tape further comprises a third layer bonded to said second layer, said third layer comprising powdered metal selected from the group consisting of nickel, cobalt, and iron powders, said powdered metal bonded together by fibrillated polytetrafluoroethylene.

* * * * *